United States Patent [19]

Bourelier

[11] Patent Number: 4,925,379
[45] Date of Patent: May 15, 1990

[54] DEVICE FOR PRODUCING A PLASTIC SHEET OF HIGH OPTICAL QUALITY

[75] Inventor: Claude Bourelier, Paris, France

[73] Assignee: Saint-Gobain Vitrage "Les Miroirs", Courbevoie, France

[21] Appl. No.: 270,807

[22] Filed: Nov. 14, 1988

[30] Foreign Application Priority Data

Nov. 12, 1987 [FR] France .................. 87 15626

[51] Int. Cl.⁵ ............... B29C 47/06; B29C 47/88; B32B 31/20
[52] U.S. Cl. ........................ 425/94; 264/171; 264/211.12; 425/101; 425/104; 425/112; 425/327; 425/363; 425/378.1; 425/397; 425/445
[58] Field of Search ............ 264/1.6, 2.6, 171, 211.12, 264/236; 425/94, 96, 101, 104, 363, 371, 378.1, 382.3, 445, 112, 327, 397

[56] References Cited

U.S. PATENT DOCUMENTS

| 2,574,588 | 11/1951 | Piperoux et al. | 264/211.12 |
| 3,232,780 | 2/1966 | Kupits | 427/194 |
| 3,756,760 | 9/1973 | McBride | 425/363 |
| 4,035,549 | 7/1977 | Kennar | 428/409 |
| 4,368,024 | 1/1983 | Asano | 425/397 |
| 4,826,560 | 5/1989 | Held | 425/371 X |

FOREIGN PATENT DOCUMENTS

| 133090 | 2/1985 | European Pat. Off. . |
| 212232 | 3/1987 | European Pat. Off. . |
| 1729016 | 6/1971 | Fed. Rep. of Germany . |
| 1039678 | 10/1953 | France . |

Primary Examiner—Jeffery Thurlow
Assistant Examiner—Leo B. Tentoni
Attorney, Agent, or Firm—Oblon, Spivak, McClelland, Maier & Neustadt

[57] ABSTRACT

A process and a device for producing a plastic sheet of high optical quality and including at least one layer having a base of a polyurethane exhibiting energy-absorbing properties. The polyurethane layer is obtained by extrusion followed immediately after by a finishing by a pressing at a temperature higher than the temperature of the softening point of the polyurethane layer. The finishing imparts to the sheet optical quality making it suitable for use in the production of laminated glazings.

5 Claims, 1 Drawing Sheet

DEVICE FOR PRODUCING A PLASTIC SHEET OF HIGH OPTICAL QUALITY

FIELD OF THE INVENTION

This invention relates to the production of a transparent plastic sheet of high optical quality which can be used alone or in association with other materials and particularly in so-called asymmetrical laminated glazings where it is associated with a monolithic or laminated support, of glass and/or plastic (for example, vehicle windshields), the plastic sheet comprising at least one layer having a polyurethane base exhibiting energy-absorbing properties.

BACKGROUND OF THE INVENTION

From the publication of European Pat. No. 0,133,090, a transparent sheet of high optical quality able to be used alone or in association with other materials and particularly in the production of the previously described laminated glazings is known. This sheet comprises a layer made in a continuous process by reactive casting, on a horizontal plane from which it can be removed, of a reaction mixture of an isocyanate component and an active hydrogen component, particularly a polyol component. The isocyanate component preferably comprises a cycloaliphatic, an aliphatic diisocyanate, or a diisocyanate prepolymer, and it preferably has a viscosity less than about 5000 centipoises at $+40°$ C. The polyol component preferably comprises a difunctional long polyol with a molecular weight between 500 and 4000 and a short diol as a chain lengthening agent. By "reactive casting" is meant casting in the form of a layer or a film of a liquid mixture of components in the monomer or prepolymer state, followed by a polymerization of this layer by heat.

The known reactive casting obtains a layer of high optical quality in a single operation. However, one of the drawbacks of this production process is the necessity of using a long polymerization tunnel to obtain a complete polymerization and thus to avoid a marking on winding at the end of the line or, further, an additional treatment to prevent this marking.

Polyurethane sheets that can be used in laminated glazings can also be produced by extrusion. However, the extruded sheet does not directly have optical quality. Optical quality is obtained later during assembly with other elements of the glazing. When the extruded polyurethane sheet is used as an inner layer, the optical quality is obtained at the time of the assembly by pressing with the other elements of the glazing. When the polyurethane sheet is used as an outer layer in an asymmetric laminated sheet, optical quality can be obtained using the countermold assembly process. For this purpose, a glass sheet is used with a shape identical to the one constituting the rigid element of the glazing in the case of a flexible plastic-glass glazing of polyurethane. The glass sheet is placed against the free face of the flexible sheet, and the unit is pressed at the assembly temperature of the laminated glazings (i.e., at about 120–130° C.) for about 1 hour.

One of the drawbacks of the countermold process, particularly in the production of a laminate glazing of glass-flexible sheet, is the necessity of using as a countermold a second glass sheet with the same shape as the glass sheet entering into the composition of the glazing and which for this purpose is curved simultaneously with the glazing, and which after use is scrapped.

Another drawback of the countermold process is that, in certain cases, the optical quality can be only temporary. That is, defects placed in "memory" in the glass can reappear after several days or several months.

SUMMARY OF THE INVENTION

The invention proposes a process which eliminates or substantially ameliorates the drawbacks of the prior art. According to this process, a polyurethane layer having energy-absorbing properties is produced by extrusion, and, just afterwards, the polyurethane layer is subjected to a finishing by pressing at a layer temperature higher than the temperature of the softening point of the polyurethane to impart to it optical quality rendering it suitable to be used in the production of laminated glazings without use of a countermold.

The finishing which follows the extrusion can be performed particularly by a controlled squeezing of the layer between two plates or between two metal strips, brought to the previously indicated suitable temperatures.

The finishing can also be performed by a gradual hot rolling at suitable temperatures between series of rollers.

The finishing can also be obtained by a hot pressing at suitable temperatures on a cylindrical surface.

The finished layer can optionally undergo later treatments. For example, the finished layer can be coated with another layer to impart surface properties to the sheet such as resistance to scoring, resistance to abrasion, etc. The finished layer can also undergo treatments modifying its surface properties without thereby altering the optical quality obtained. For instance, the face intended to be directed outward in the laminated glazing can be treated by acrylics or methacrylics.

The invention also relates to a device for carrying out the process. The device comprises an extruder and means for hot finishing of the layer (i.e., means for obtaining a uniform thickness and a smooth surface state and a high optical quality for the layer).

In one embodiment of the device, the device comprises as finishing means a press equipped with two perfectly flat plates, such as glass or steel plates coated with an anti-adhering agent. The two flat plates are heated to a temperature higher than the temperature of the softening point of the extruded layer.

According to a characteristic of the device, the press is driven with a reciprocal motion following the movement of the sheet during the entire pressing operation and returning to the starting point to act on another section of the extruded sheet.

Between the extruder and the finishing means, rollers can be provided around which the sheet passes and between which it can relax.

In a second embodiment of the device, the press is at a fixed station, and one of the rollers between the extruder and the press is a waltzing roller which forms a plug between the extruder (which delivers the layer at a constant speed) and the press, (which acts discontinuously).

In a third embodiment of the device, the device is equipped with two metal strips which together form a pressing tunnel.

In a fourth embodiment of the device, the means for obtaining the optical quality is a series of laminating rollers.

In a fifth embodiment of the device, the means for obtaining the optical quality is made of at least one large cylinder on which the extruded layer can be spread out by pressing.

The device according to the invention can also comprise other means (such as means for supplying a cast layer, or means for supplying a layer by spraying) for covering the extruded layer after its finishing.

Other characteristics and advantages of the invention will appear in the description of embodiments of the device according to the invention made with reference to the figures.

DETAILED DESCRIPTION OF THE PRESENTLY PREFERRED EMBODIMENTS

The First Embodiment

Figure 1:
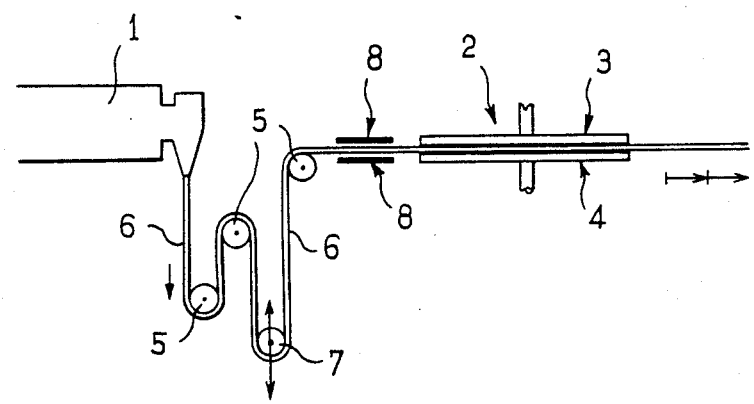
FIG. 1 represents diagrammatically a first embodiment of a device using as finishing means a press placed at a fixed station.

The device represented in FIG. 1 comprises an extruder 1 and a press 2 equipped with two glass plates 3, 4 coated with an anti-adhering product. The press 2 is placed downstream from the extruder 1. Between the press 2 and the extruder 1, the device comprises several fixed rollers 5 and a waltzing roller 7 around which an extruded sheet (or layer) 6 passes. The waltzing roller 7 can move vertically in both directions, and it thus separates the extrusion-finishing line into an upstream part in which the sheet 6 is driven at a constant speed corresponding to the extrusion speed and a downstream part in which the sheet 6 is driven with a step-by-step advancing movement corresponding to the discontinuous pressing in time of a portion of the sheet 6.

A heating means 8 can be provided just upstream from the press 2 to bring the sheet 6 to a temperature higher than the temperature of the softening point. The heating means 8 is provided where the sheet 6 would be too cooled between the extruder 1 and the press 2.

The Second Embodiment

Figure 2:
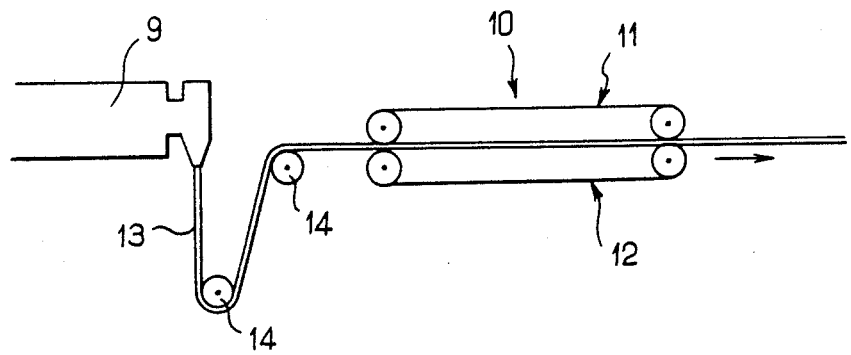
FIG. 2 represents diagrammatically a second embodiment of the device using as finishing means two metal strips operating continuously.

The device represented in FIG. 2 comprises an extruder 9 and a press 10 that operates continuously. The press 10 is made of two endless metal strips 11, 12 moving at the same speed as an extruded layer 13. The two strips 11, 12 exert a continuous pressing by being held at a set distance from one another. The set distance is slightly less than the thickness of the layer 13. The two strips 11, 12 are also coated with an anti-adhering product. In this device, the finishing of the layer 13 is performed after passing around the rollers 14 at the same speed as its formation at the output of the extruder 9.

ILLUSTRATIVE EXAMPLES

The following examples illustrate the invention.

Example 1

In a reactor, a polytetramethyleneglycol with a molecular weight of 1000 was mixed, the proportions of the constituents being such that the polytetramethyleneglycol contributes 0.37 equivalent of hydroxyl groups while butanediol-1,4 contributes 0.63. Dibutyltin dilaurate was added at a rate of 0.03% by weight of the total weight of the polyol component and the isocyanate component. The isocyanate component (i.e., 3-isocyanatomethyl-3,5,5-trimethylcyclohexylisocyanate (IPDI)) exhibited urea functions obtained by a partial hydrolysis of the IPDI and had a content of NCO groups of about 31.5% by weight. The components were taken in quantity so that the NCO/OH ratio was 1. The mixture was brought to 140° C. for 20 minutes. The product obtained was introduced in the extruder of the device described in relation with FIG. 1.

The extrusion was performed at a temperature of 190° C. At the output, the sheet 6 possessed a surface state exhibiting striae and scorings. After passing around the rollers 5 and the waltzing roller 7, the sheet 6 arrived step-by-step at the press 2, where it underwent a pressing of 10 bars at 180° C. for 1 minute. During the pressing, the waltzing roller 7 moved to absorb the length of the extruded layer. At the output of the press 2, the sheet 6 was perfectly smooth. It could be used directly for the production of the laminated glazing, after—if necessary—having been coated with a protective layer assuring resistance to scoring or to abrasion.

Control Example 1

The procedure was performed as in Example 1, except that the finishing was performed by pressing at a 140° C. layer temperature with a pressure of 10 bars for 1 minute. At the output of the press, the layer exhibited surface defects corresponding to lines from the extrusion. (The softening point of the layer was 165° C.)

Control Example 2

The procedure was performed as in Control Example 1 except that the pressure was performed at a layer temperature of 130° C. with a pressure of 10 bars for 15 minutes. The layer at the output of the press still exhibited some surface defects.

Example 2

A polyurea-polyurethane was prepared as follows:

70 kg (31.2 mols) of a polyadipate of 1,4-butanediol, exhibiting OH end groups, of average molecular weight close to 2200, and 34.7 kg (156.3 mols) of isocyanato-3-isocyanatomethyl-3,3,5-trimethylcyclohexane (isophorone diisocyanate) (IPDI) was stirred in a container for 12 hours, at 60° C., under nitrogen. Then, 7.5 kg (83.3 mols) of 1,4-butanediol and 1.4 kg (10.45 mols) of dimethylolpropionic acid were added, and the mixture was again stirred for 2 hours at 100° C.

Next, there was continuously introduced, by separate pipes, at a rate of 600 g/sec (0.313 mol) of previously obtained NCO prepolymer and 26.6 g/sec (0.313 mol) of isophoronediamine (IPDA), in the feed hopper of a heated double-screw extruder. The ratio of the length to the diameter of the screws was about 40.

The temperatures of the molten product were spread along the screws from 120° C. to 220° C. The molten product was cooled suddenly in a water bath, then cleared of water sticking to the compressed air before being granulated. It appeared in the form of a colorless resin, exhibiting the transparency of glass. The content of NH-CO-NH- groups was 2.46% by weight.

Using a double-screw extruder, the granules of the previously obtained polyurethane-polyurea were extruded. The extrusion was performed at a stock temperature of about 200° C. in a layer 0.8 mm thick.

The layer was then passed discontinuously into the press of the device described in relation to FIG. 1, where it was pressed at 180° C. for 1 minute under a pressure of 10 bars. The layer at the output of the press exhibited optical quality, making it possible for it to be used in laminated glazings without its being necessary to use the countermold process.

Control Example 3

The procedure was performed as in Example 2 except that the pressing was performed at a layer temperature of 130° C., at a pressure of 10 bars, and for 1 minute. At the output of the press, the layer exhibited surface defects. (The softening point of the layer was 140° C.)

Caveat

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by letters patent of the U.S. is:

1. A device for producing a plastic sheet of high optical quality, said device comprising:
   (a) an extruder for continuously extruding a plastic sheet;
   (b) a press placed at fixed station downstream from said extruder, the working surfaces of said press being coated with an anti-adhering product that obtains optical quality on the plastic sheet, said press intermittently gripping the plastic sheet in use, whereby the movement of the plastic sheet downstream of said press is step-by-step;
   (c) a heating means placed immediately upstream of said press for heating the plastic sheet to a temperature higher than the temperature of the softening point of the plastic sheet;
   (d) a plurality of fixed rollers over which, in use, the plastic sheet is trained, said plurality of fixed rollers being located between said extruder and said heating means; and
   (e) a waltzing roller located between said extruder and said heating means, said waltzing roller being vertically movable to maintain tension in the plastic sheet upstream of said press while said press is closed.

2. A device according to claim 1 wherein said plurality of fixed rollers comprise:
   (a) a first fixed roller located downstream of said extruder;
   (b) a second fixed roller located downstream of said first fixed roller and upstream of said waltzing roller; and
   (c) a third fixed roller located downstream of said waltzing roller and upstream of said heating means.

3. A device according to claim 2 wherein:
   (a) said extruder extrudes the plastic sheet downwardly;
   (b) said first fixed roller is located beneath and to one side of said extruder;
   (c) said second fixed roller is located above and to one side of said first fixed roller; and
   (d) said third fixed roller is located above and to one side of said second fixed roller.

4. A device according to claim 1 and further comprising means for supplying an additional layer on the plastic sheet, said means being placed downstream from said press.

5. A device according to claim 1 and further comprising means for the later treatment of the plastic sheet, said means being located downstream of said press.

* * * * *